(12) United States Patent
Kusaka

(10) Patent No.: US 8,081,448 B2
(45) Date of Patent: Dec. 20, 2011

(54) ELECTRONIC APPARATUS

(75) Inventor: Hiroyuki Kusaka, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/949,691

(22) Filed: Nov. 18, 2010

(65) Prior Publication Data

US 2011/0211299 A1 Sep. 1, 2011

(30) Foreign Application Priority Data

Feb. 26, 2010 (JP) ................................. 2010-042898

(51) Int. Cl.
G06F 1/16 (2006.01)
H05K 5/00 (2006.01)
(52) U.S. Cl. ......... 361/679.55; 361/679.19; 361/679.01; 361/679.09
(58) Field of Classification Search ............. 361/679.01, 361/679.02, 679.3, 679.08, 679.09, 679.19, 361/679.26, 679.55, 701
See application file for complete search history.

(56) References Cited

U.S. PATENT DOCUMENTS

| | | | | |
|---|---|---|---|---|
| D321,866 S | * | 11/1991 | Newhouse | D14/326 |
| 5,760,351 A | * | 6/1998 | Tsai | 200/5 A |
| 6,775,128 B2 | * | 8/2004 | Leitao | 361/679.02 |
| 6,775,130 B2 | * | 8/2004 | Cronk | 361/679.33 |
| 2002/0039278 A1 | * | 4/2002 | Cronk | 361/683 |
| 2004/0142593 A1 | * | 7/2004 | Kusaka | 439/488 |
| 2007/0248485 A1 | * | 10/2007 | Abkowitz et al. | 420/417 |
| 2008/0044625 A1 | * | 2/2008 | Wang et al. | 428/142 |
| 2008/0218951 A1 | * | 9/2008 | Kusuda et al. | 361/681 |
| 2008/0266769 A1 | * | 10/2008 | Massaro et al. | 361/681 |
| 2009/0011245 A1 | * | 1/2009 | Tsai et al. | 428/411.1 |
| 2009/0296977 A1 | * | 12/2009 | Takakusaki | 381/388 |

FOREIGN PATENT DOCUMENTS

| | | |
|---|---|---|
| JP | H04-191022 A | 7/1992 |
| JP | H11-077738 A | 3/1999 |
| JP | 2000-233601 A | 8/2000 |
| JP | 2002-297309 A | 10/2002 |
| JP | 2004-042409 A | 2/2004 |

OTHER PUBLICATIONS

Notice of Reasons for Rejection mailed by Japan Patent Office on Feb. 1, 2011 in the corresponding Japanese patent application No. 2010-042898.

* cited by examiner

*Primary Examiner* — Timothy Thompson
*Assistant Examiner* — Sherman Ng
(74) *Attorney, Agent, or Firm* — Knobbe, Martens Olson & Bear, LLP

(57) ABSTRACT

According to one embodiment, an electronic apparatus includes a housing and a decorative layer. The housing includes a first portion with a grain and a smooth second portion. The decorative layer includes a first decoration on the first portion and a second decoration on the second portion. The second decoration includes substantially the same pattern as the grain.

11 Claims, 4 Drawing Sheets

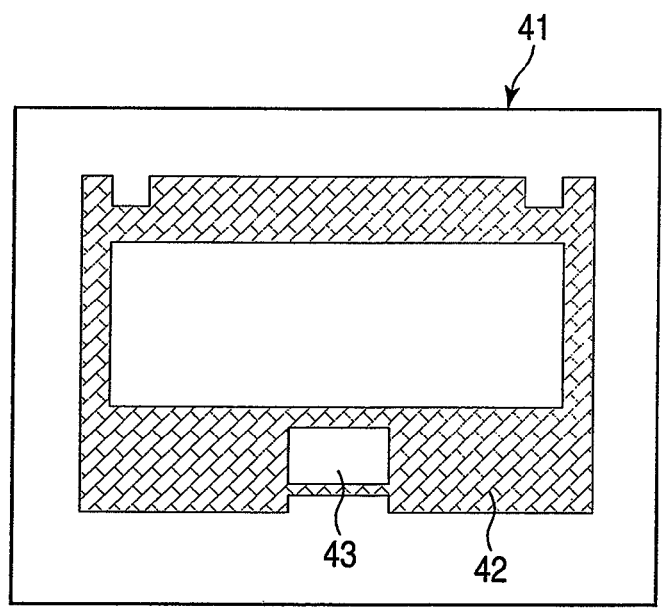
F I G. 3
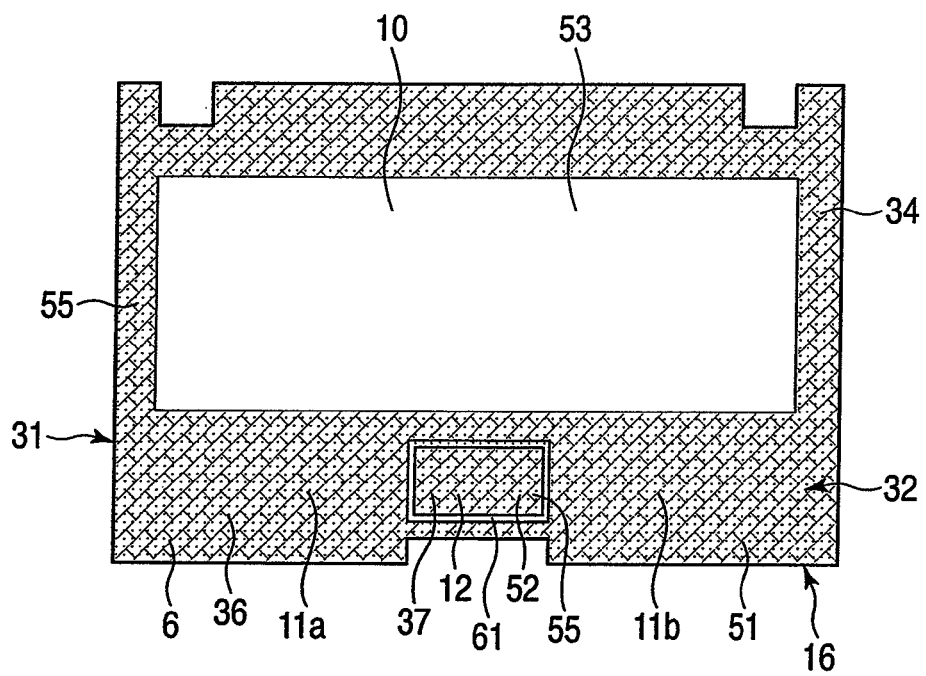
F I G. 4

ELECTRONIC APPARATUS

CROSS-REFERENCE TO RELATED APPLICATIONS

This application is based upon and claims the benefit of priority from Japanese Patent Application No. 2010-042898, filed Feb. 26, 2010; the entire contents of which are incorporated herein by reference.

FIELD

Embodiments described herein relate generally to an electronic apparatus with a decoration.

BACKGROUND

Some electronic apparatus have a decoration on the surface of their housing.

Jpn. Pat. Appln. KOKAI Publication No. 4-191022 discloses a meter panel in which a finely rugged transfer layer is provided on an irregular surface of a molded product.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary plan view of a die for molding the main cover shown in FIG. 2;

FIG. 4 is an exemplary plan view of a main cover according to a first modification of the first embodiment;

DETAILED DESCRIPTION

Various embodiments will be described hereinafter with reference to the accompanying drawings.

In general, according to one embodiment, an electronic apparatus comprises a housing and a decorative layer. The housing comprises a first portion with a grain and a smooth second portion. The decorative layer comprises a first decoration on the first portion and a second decoration on the second portion. The second decoration comprises substantially the same pattern as the grain.

Embodiments applied to a notebook computer (notebook PC) will now be described with reference to the accompanying drawings.

FIGS. 1 to 5 show an electronic apparatus 1 according to a first embodiment. The electronic apparatus 1 is, for example, a notebook PC. The electronic apparatus to which the embodiment is applicable is not limited to this type. The embodiment is widely applicable to various electronic apparatus, including a display apparatus, such as a TV, recording and playback apparatus, personal digital assistant (PDA), game machine, etc.

Figure 1:
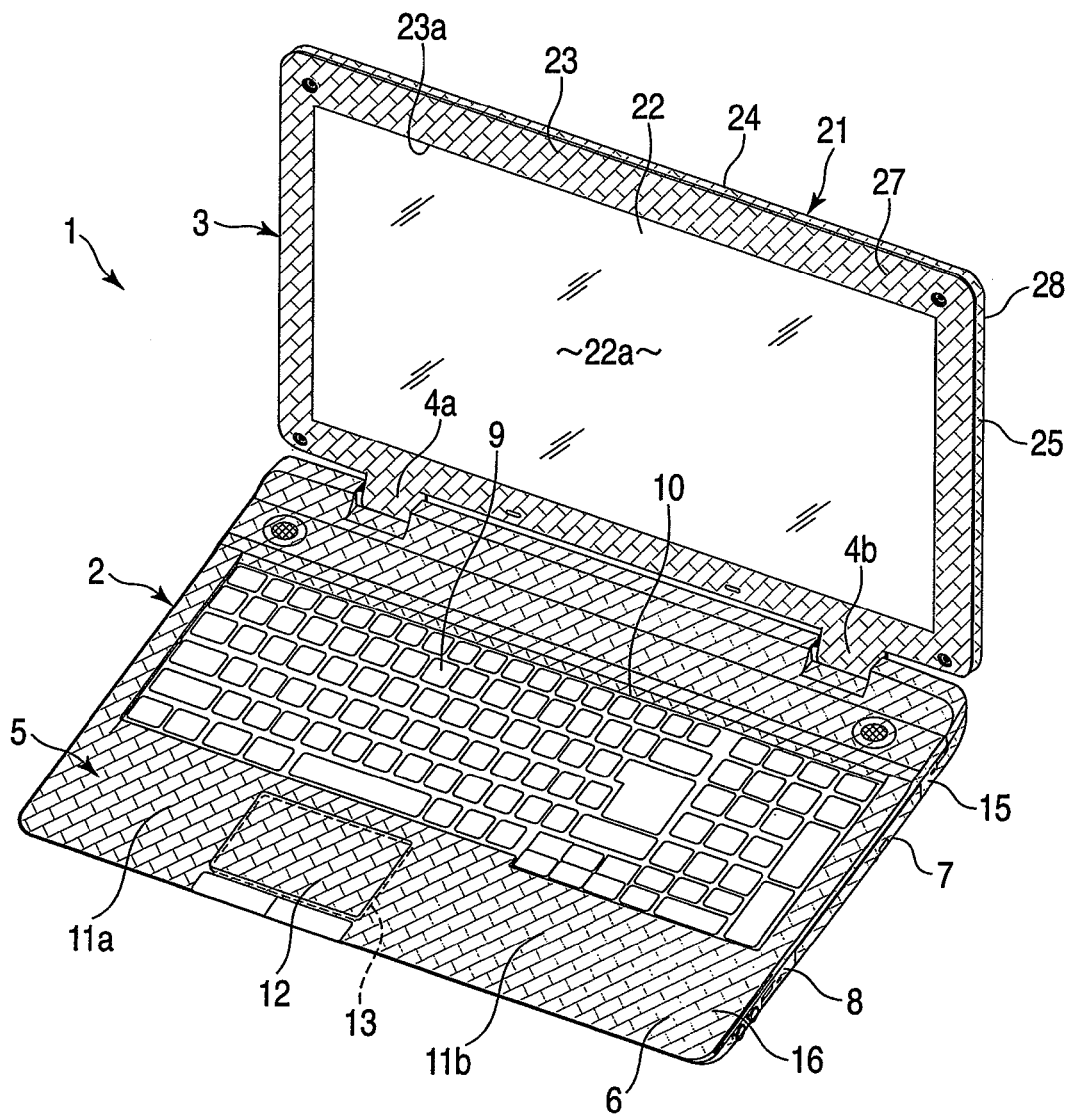
FIG. 1 is an exemplary perspective view of an electronic apparatus according to a first embodiment.

As shown in FIG. 1, the electronic apparatus 1 comprises a main unit 2, display unit 3, and hinges 4a and 4b. The main unit 2 is an electronic apparatus main body with a main board. The main unit 2 comprises a main housing 5, which is an example of "housing". The main housing 5 is a flat box comprising top, bottom, and peripheral walls 6, 7 and 8.

The bottom wall 7 faces the top of a desk when the electronic apparatus 1 is placed on the desk. The bottom wall 7 spreads substantially parallel to the desktop. The top wall 6 spreads substantially parallel to the bottom wall 7 (i.e., substantially horizontally) with a space therebetween. The top wall 6 is provided with a keyboard area 10 on which a keyboard 9 is mounted. The peripheral wall 8 rises from the bottom wall 7 and connects the respective peripheral edges of the top and bottom walls 6 and 7.

As shown in FIG. 1, the top wall 6 comprises palmrests 11a and 11b and touchpad area 12 on the front side of the keyboard area 10. The main housing 5 contains, for example, a capacitance-type touchpad 13. The touchpad 13 faces the touchpad area 12 from inside the main housing 5. A user can input a coordinate position or the like to the touchpad 13 by fingering the touchpad area 12.

The main housing 5 comprises a main base 15 and main cover 16. The main base 15 includes the bottom wall 7 and a part of the peripheral wall 8. The main cover 16 includes the top wall 6 and a part of the peripheral wall 8. The main housing 5 is formed by combining the main cover 16 with the main base 15.

The display unit 3 is pivotably (i.e., openably) connected to the main unit 2 by hinges 4a and 4b. The display unit 3 is pivotable between a closed position where it is leveled so as to cover the main unit 2 from above and an open position where it is raised on the main unit 2.

As shown in FIG. 1, the display unit 3 comprises a display housing 21 and display device 22 in the housing 21. The display housing 21 is an example of "housing". The display housing 21 is a flat box comprising front, rear, and peripheral walls 23, 24 and 25. In this specification, the front and rear sides of the display unit 3 are defined based on its raised posture.

The front wall 23 faces the top wall 6 of the main unit 2 when the display unit 3 is closed. The front wall 23 faces the user when the display unit 3 is raised. The front wall 23 comprises a relatively large opening 23a through which a display screen 22a of the display device 22 is exposed to the outside.

The rear wall 24 is on the opposite side from the front wall 23 of the display housing 21. The rear wall 24 is spaced apart from the front wall 23 and spreads substantially parallel to the front wall 23. The peripheral wall 25 stands upright on the rear wall 24 so as to connect the respective peripheral edges of the front and rear walls 23 and 24.

The display housing 21 comprises a mask 27 and display housing cover 28. The mask 27 includes the front wall 23, while the cover 28 includes the rear and peripheral walls 24 and 25. The display housing 21 is formed by combining the mask 27 with the cover 28.

The following is a description of a housing decoration of the electronic apparatus 1.

Figure 2:
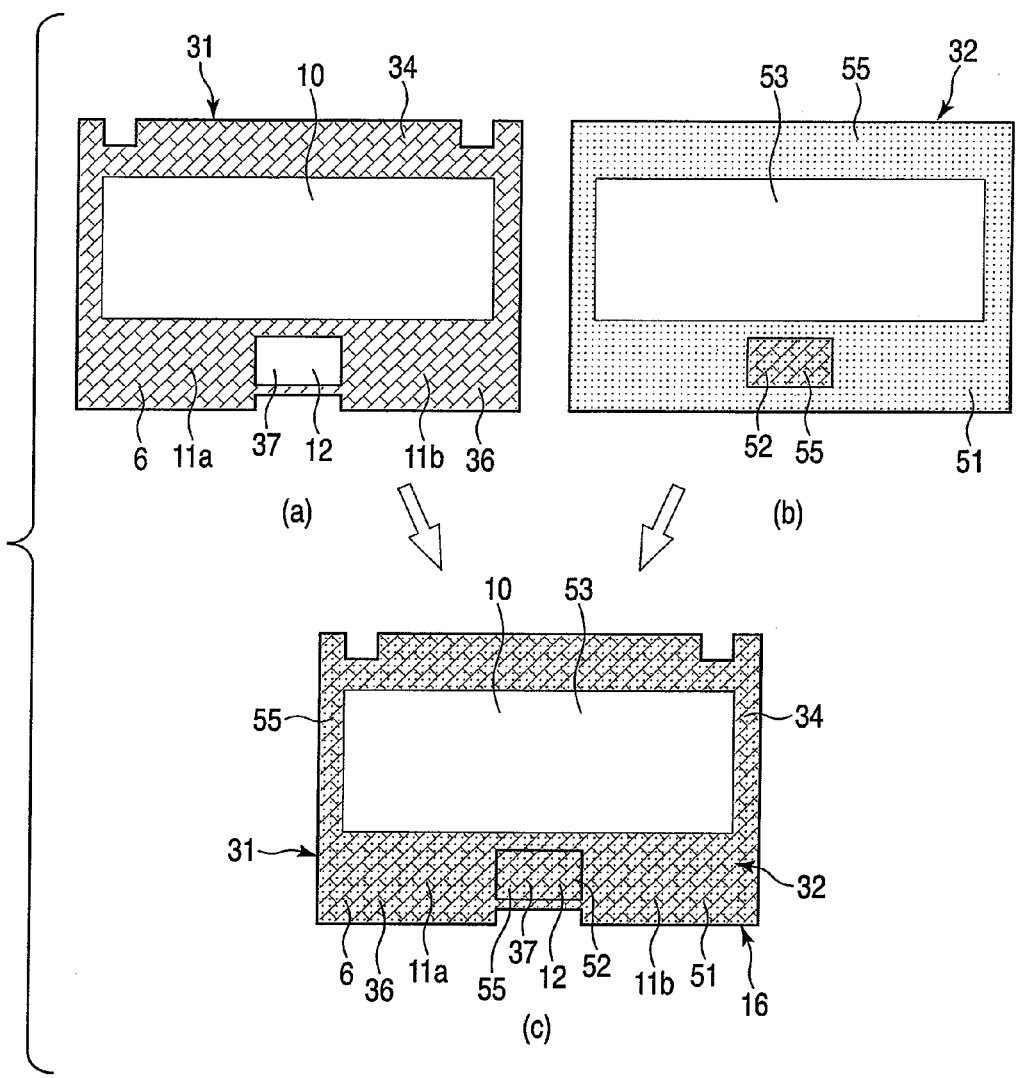
FIG. 2 is an exemplary plan view showing a configuration of a main cover shown in FIG. 1.

FIG. 2 shows a detailed configuration of the main cover 16. The main cover 16 is an example of "molded product". The main cover 16 comprises a housing main portion 31 and decorative layer 32 on its surface.

FIG. 2(a) shows the housing main portion 31, which is formed from, for example, a synthetic resin by injection molding or the like. The housing main portion 31 comprises the palmrests 11a and 11b, touchpad area 12, keyboard area 10, and surface portion 34 of the top wall 6 which is provided off these elements. The surface portion 34 is exposed to the outside and constitutes a part of the contour of the main housing 5.

According to another classification, the housing main portion 31 comprises first and second portions 36 and 37. The first portion 36 has a grain, which comprises a plurality of projections or recesses. The grain includes fine irregularities on the surface of the housing main portion 31, based on various patterns, such as leather-grain, wood-grain, rock-grain, sand-grain, satin-finished, or geometric patterns. Alternatively, the grain may be simply dotted. A grained region is less susceptible to fingerprints than a smooth region.

The grain according to the present embodiment has a predetermined texture. Specifically, the grain of the present embodiment has such a pattern texture that predetermined patterns are continuously arranged. Typically, as shown in FIG. 1, the pattern texture may be such a snakeskin-like texture that small rectangular patterns are continuously arranged.

The second portion 37 has a smooth surface without a grain.

As shown in FIG. 2(a), the palmrests 11a and 11b and surface portion 34 are included in the first portion 36 and provided with grains, individually. The touchpad area 12 is included in the second portion 37 and has a smooth surface. The keyboard area 10 has a smooth surface without a grain.

FIG. 3 shows a die 41 for molding the housing main portion 31. The die 41 comprises first and second regions 42 and 43 corresponding to the first and second portions 36 and 37, respectively. The first region 42 has irregularities that serve to form the grain on the housing main portion 31. The second region 43 comprises a smooth surface for forming the second portion 37 smooth.

FIG. 2(b) shows the decorative layer 32 of the main cover 16. The decorative layer 32 is an in-mold foil provided on the housing main portion 31 by in-mold molding. More specifically, the decorative layer 32 is formed by in-mold rolling (IMR). According to the IMR, only an ink layer of a decorative film is transferred to the housing main portion 31, and no film remains on the housing main portion 31. The decorative layer 32 may alternatively be formed by in-mold forming (IMF) or other method. According to the IMF, the ink layer and film remain on the housing main portion 31.

The decorative layer 32 comprises first and second decorations 51 and 52 and non-decorative portion 53. The first decoration 51 is provided to cover the entire first portion 36 of the housing main portion 31. The first decoration 51 is a plain part without a pattern, for example. The first decoration 51 comprises a paint layer 55 (dotted in FIG. 2), whereby the first portion 36 is colored, and a coating layer (not shown). The first decoration 51 may be designed with, for example, a wavy or more complicated pattern, as well as with the paint layer 55. Further, the first decoration 51 does not need to comprise a paint layer.

The second decoration 52 is provided to cover the entire second portion 37 of the housing main portion 31. The second decoration 52 comprises a paint layer 55 of the same color as the first decoration 51 and a coating layer (not shown). Further, the second decoration 52 has substantially the same pattern as the grain of the first portion 36. The second decoration 52 has substantially the same texture as the grain. The second decoration 52 has such a pattern texture that substantially the same patterns as the predetermined pattern of the grain are continuously arranged. The second decoration 52 according to the present embodiment has such a snakeskin-like texture that small rectangular patterns are continuously arranged.

FIG. 2(c) shows a combination of the housing main portion 31 and decorative layer 32. As shown in FIG. 2(c), the texture of the second decoration 52 is substantially continuous with that of the grain at the boundary between the first portion 36 and the second portion 37. Thus, the respective textures of the grain and second decoration 52 form a continuous pattern without a break.

The "substantially continuous" textures are ones whose constituent lines or the like are connected in a series. The "substantially continuous" textures also include ones whose constituent lines are somewhat deviated from one another due to component tolerances.

The non-decorative portion 53, which is located in the keyboard area 10, includes neither a pattern nor a paint layer.

The following is a description of a manufacturing method for the main cover 16.

The die 41 is prepared first, and the decorative film (in-mold foil) comprising the decorative layer 32 is then prepared. Thereafter, the decorative film is set in the die 41 and subjected to in-mold molding. When this is done, the decorative layer 32 of the decorative film is transferred to the injection-molded housing main portion 31. The molded product is obtained by taking out the housing main portion 31 from the die 41.

The design can be improved according to the electronic apparatus 1 constructed in this manner. Specifically, if the housing surface is made smooth, fingerprints are inevitably conspicuous. Then, providing a grain for the housing surface makes the design improved and diminishes the fingerprints. If a no-grain region exists in, for example, a part of the housing surface, however, its texture is different from that of the grained region, so that the integrity of the design of the entire electronic apparatus may be spoiled.

Accordingly, the inventor hereof supposed to affix a seal having substantially the same pattern as the grain to the no-grain region. However, affixing the seal results in an increase in the number of components and entails an additional process, that is, a seal affixing process.

According to the present embodiment, on the other hand, the decorative layer 32 is transferred to the housing main portion 31 that comprises the grained first portion 36 and smooth second portion 37. The first decoration 51 is placed on the first portion 36, while the second decoration 52 is placed on the second portion 37, the second decoration 52 having substantially the same pattern as the grain.

Since substantially the same pattern as the grain is printed on the no-grain second portion 37, according to this arrangement, the first and second portions 36 and 37 have substantially the same pattern, so that the design integrity of the entire electronic apparatus can be easily obtained. According to the present embodiment, moreover, the number of essential components can be reduced, and the necessity of the seal affixing process can be obviated.

According to the present embodiment, furthermore, colors, patterns, etc., can be applied to the housing main portion 31 by means of the first decoration 51 on the first portion 36. Specifically, the grained portion can be painted with the in-mold foil on which substantially the same pattern as the grain is printed. Thus, the grained portion can be painted without performing an additional painting process. This contributes to a reduction in manufacturing cost.

If the grain has substantially the same texture as the second decoration 52, the design integrity of the electronic apparatus is enhanced. If the respective textures of the grain and second decoration 52 are substantially continuous with each other, in particular, the decorative properties are improved and the design integrity is further enhanced. If the textures of the grain and second decoration 52 are formed based on continuous arrays of predetermined patterns, they can be easily made continuous.

In affixing the seal, for example, it is difficult to make the respective textures of the grain and seal continuous with each other. In the present embodiment, on the other hand, the respective textures of the grain and second decoration 52 are made continuous by in-mold molding. This in-mold molding can correct the alignment of films at the time of die adjustment before mass production. Therefore, the position alignment can be performed more accurately than in the case where the seal is affixed. Thus, the textures of the grain and second decoration 52 can be more easily made continuous by in-mold molding.

If the first and second portions 36 and 37 correspond to the palmrests 11a and 11b and touchpad area 12, respectively, fingerprints cannot be easily left on the wider palmrests 11a and 11b, and an input operation can be easily performed by means of the smooth touchpad area 12.

If the decorative layer 32 is formed by in-mold rolling, only the ink layer is transferred without leaving any film on the molded product, so that the grain can easily clearly appear on the outside of the product. Since no film remains on the touchpad area 12, moreover, the electrical properties of the capacitance-type touchpad 13 can be easily adjusted.

(First Modification)

FIG. 4 shows a first modification of the first embodiment. In a main cover 16 according to the first modification, as shown in FIG. 4, a second decoration 52 is smaller than a second portion 37. Thus, a no-pattern blank area (i.e., margin area) 61 is formed at the boundary between a first portion 36 and the second decorative layer 52.

More specifically, the blank area 61 comprises a paint layer 55 of the same color as first and second decorations 51 and 52 and is not patterned corresponding to the grain of the first portion 36. The blank area 61 is in the form of a frame that surrounds the entire circumference of the second decoration 52.

According to an electronic apparatus 1 constructed in this manner, the design can be improved in the same manner as in the first embodiment. The blank area 61 serves to obscure a dislocation, if any, between the textures of the grain and the second decoration 52. The user can recognize the blank area 61 as an aid to the visual discrimination of the touchpad area 12 without substantial discomfort.

(Second Modification)

Figure 5:
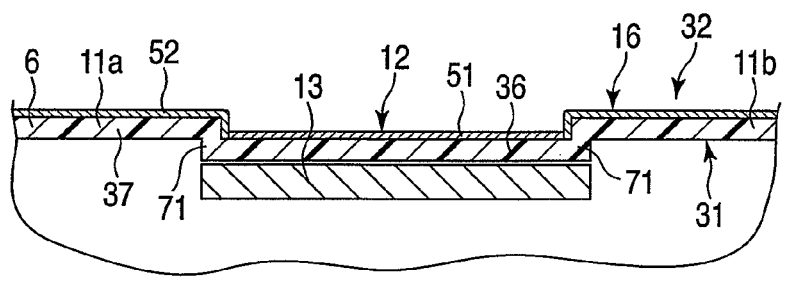
FIG. 5 is an exemplary sectional view of an electronic apparatus according to a second modification of the first embodiment.

FIG. 5 shows a second modification of the first embodiment. In an electronic apparatus 1 according to the second modification, as shown in FIG. 4, a touchpad area 12 as a second portion 37 is depressed relative to palmrests 11a and 11b, which constitute a part of a first portion 36. Specifically, there is a level difference 71 between the first and second portions 36 and 37. A second decoration 52 is provided in the depressed touchpad area 12, and a first decoration 51 in the remaining area.

According to the electronic apparatus 1 constructed in this manner, the design can be improved in the same manner as in the first embodiment. The level difference 71 between the first and second portions 36 and 37 serves to obscure a dislocation, if any, between the textures of a grain and the second decoration 52. The user can recognize the level difference 71 as an aid to the visual discrimination of the touchpad area 12 without substantial discomfort.

Second Embodiment

An electronic apparatus 1 according to a second embodiment will now be described with reference to FIG. 6. Like numbers are used to designate configurations of the first and second embodiments having the same or similar functions throughout the several views, and a description thereof is omitted. Other configurations than the following are the same as those of the first embodiment.

Figure 6:
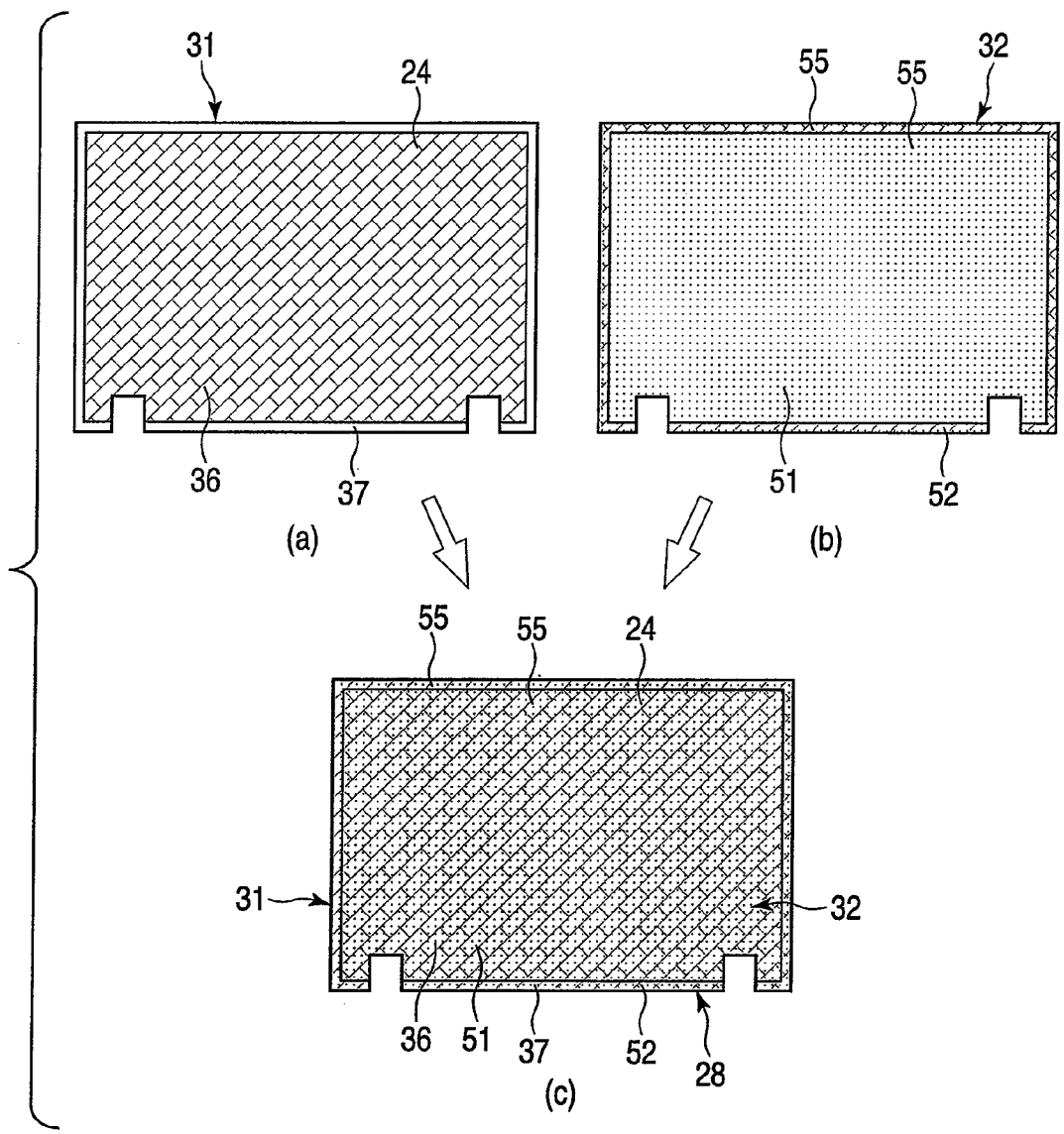
FIG. 6 is an exemplary plan view showing a configuration of a display housing cover according to a second embodiment.

FIG. 6 shows a cover 28 of a display housing 21. The cover 28 is an example of "molded product". FIG. 6(a) shows a housing main portion 31. As shown in FIG. 6(a), first and second portions 36 and 37 are provided at a central portion and edge portion, respectively, of the housing main portion 31.

FIG. 6(b) shows a decorative layer 32. As shown in FIG. 6(b), a first decoration 51 is provided at a central portion of the decorative layer 32 so as to correspond to the first portion 36 of the housing main portion 31. A second decoration 52 is provided at an edge portion of the decorative layer 32 so as to correspond to the second portion 37 of the housing main portion 31.

FIG. 6(c) shows a combination of the housing main portion 31 and decorative layer 32. As shown in FIG. 6(c), the texture of the second decoration 52 is substantially continuous with that of a grain at the boundary between the first portion 36 and the second portion 37. Thus, the respective textures of the grain and second decoration 52 form a continuous pattern without a break.

According to the electronic apparatus 1 constructed in this manner, the design can be improved in the same manner as in the first embodiment. The first and second portions 36 and 37 can provide the central and edge portions of the housing main portion 31 with matted and glossy textures, respectively.

Although the electronic apparatus 1 according to the first and second embodiments have been described herein, the present invention is not limited to these embodiments. The constituent elements of the first and second embodiments may be suitably used in combination with one another. Further, the invention is not limited directly to the above-described embodiments, and its constituent elements may be embodied in modified forms without departing from the scope or spirit of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing comprising a first portion with a grain and a smooth second portion; and
   a pattern layer comprising a plain first pattern disposed over the first portion and a second pattern disposed over the second portion, the second pattern comprising a pattern expressing substantially the same pattern as the grain,
   wherein the pattern layer overlays the housing such that a surface of the first portion and a surface of the second portion result in substantially the same pattern.

2. The electronic apparatus of claim 1, wherein the pattern layer is formed by in-mold molding.

3. The electronic apparatus of claim 1, wherein the grain has a texture, and the second pattern has substantially the same texture as the grain.

4. The electronic apparatus of claim 3, wherein each of the texture of the grain and the texture of the second pattern comprises an array of predetermined patterns.

5. The electronic apparatus of claim 4, wherein the texture of the second pattern is substantially continuous with the texture of the grain at a boundary between the first portion and the second portion.

6. The electronic apparatus of claim 1, wherein the first pattern comprises a paint layer.

7. The electronic apparatus of claim 1, wherein the first portion comprises a palmrest, and the second portion comprises a touchpad area.

8. The electronic apparatus of claim 1, wherein the pattern layer is formed by in-mold rolling.

9. The electronic apparatus of claim 1, wherein the pattern layer further comprises a blank area at a boundary between the first pattern and the second pattern.

10. An electronic apparatus comprising:
a housing comprising a first portion with a plurality of projections and a smooth second portion; and
a pattern layer comprising a plain first pattern disposed over the first portion and a second pattern disposed over the second portion, the second pattern comprising a a pattern expressing substantially the same pattern as the projections,
wherein the pattern layer overlays the housing such that a surface of the first portion and a surface of the second portion result in substantially the same pattern.

11. An electronic apparatus comprising:
a housing comprising a first portion with a grain and a smooth second portion; and
a pattern layer comprising a plain portion disposed over the first portion and a patterned portion disposed over the second portion, the patterned portion comprising a pattern expressing substantially the same design as the grain,
wherein the pattern layer overlays the housing such that a surface of the first portion and a surface of the second portion result in substantially the same design.

\* \* \* \* \*